(12) United States Patent
Ferrill et al.

(10) Patent No.: US 9,317,643 B2
(45) Date of Patent: Apr. 19, 2016

(54) TECHNOLOGY FOR TEMPERATURE SENSITIVE COMPONENTS IN THERMAL PROCESSING

(71) Applicant: International Business Machines Corporation, Armonk, NY (US)

(72) Inventors: Mitchell G. Ferrill, Little Meadows, PA (US); Curtis Grosskopf, Hyde Park, NY (US); Matthew S. Kelly, Oakville (CA); Thomas H. Lewis, Apex, NC (US); Wen Wei Low, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/284,747

(22) Filed: May 22, 2014

(65) Prior Publication Data
US 2015/0342056 A1    Nov. 26, 2015

(51) Int. Cl.
*G06F 17/50*    (2006.01)
(52) U.S. Cl.
CPC .................... *G06F 17/5068* (2013.01)
(58) Field of Classification Search
CPC ...................................................... H05K 3/0005
USPC ......................................................... 716/137
See application file for complete search history.

(56) References Cited

U.S. PATENT DOCUMENTS

| | | | |
|---|---|---|---|
| 7,103,434 B2 * | 9/2006 | Chernyak et al. | 700/98 |
| 7,855,893 B2 | 12/2010 | Pengelly | |
| 8,299,393 B2 | 10/2012 | Kelly | |
| 8,308,356 B2 | 11/2012 | Melgaard | |
| 2004/0074581 A1 | 4/2004 | Hardy | |
| 2004/0124233 A1 | 7/2004 | Ensslin | |
| 2005/0046014 A1 | 3/2005 | Wong | |
| 2009/0277608 A1 | 11/2009 | Kamins | |
| 2011/0317361 A1 | 12/2011 | Schimpl | |

* cited by examiner

*Primary Examiner* — Jack Chiang
*Assistant Examiner* — Brandon Bowers
(74) *Attorney, Agent, or Firm* — Anthony V. S. England; Damion Josephs

(57) ABSTRACT

A method for printed circuit board design of temperature sensitive components includes a scrub tool receiving a list of part numbers for electronic components of a printed circuit board assembly ("PCBA"). The scrub tool sends one or more queries for finding temperature and time limits of the electronic components to a database. A mapping tool receives a selection of one or more part numbers responsive to the one or more queries, wherein the selection is responsive to the temperature and time limits. The mapping tool sends a data structure to a physical design tool which is configured with physical design data for generating a graphic representation of the PCBA. The data structure from the mapping tool provides the received selection of one or more part numbers and configures the physical design tool to highlight components having part numbers of the selection on the PCBA graphic representation.

12 Claims, 6 Drawing Sheets

TECHNOLOGY FOR TEMPERATURE SENSITIVE COMPONENTS IN THERMAL PROCESSING

FIELD OF THE INVENTION

The present invention relates to technology for printed circuit board design involving temperature sensitive components.

BACKGROUND

In the manufacturing of electronic devices, a device manufacturer may procure electronic components from component manufacturers and attach the components to a printed circuit board assembly ("PCBA"), wherein the components are appropriately connected together to form operating circuits. In this context, a bill of materials ("BOM") for a printed circuit board assembly may list electronic components that populate the PCBA.

SUMMARY

According to an embodiment of the invention, a computer system implemented method includes a scrub tool of a computer system receiving a list of part numbers for electronic components of a printed circuit board assembly ("PCBA"). The scrub tool sends one or more queries to a database, wherein the one or more queries are configured for finding temperature and time limits of the electronic components having the part numbers of the list. A mapping tool of the computer system receives a selection of one or more part numbers found in the database responsive to the one or more queries, wherein the selection is responsive to the temperature and time limits. The mapping tool sends a data structure to a physical design tool of the computer system. The physical design tool is configured with physical design data for generating a graphic representation of the PCBA, including representation of components on the PCBA. The data structure from the mapping tool provides the received selection of one or more part numbers and configures the physical design tool to responsively highlight on the PCBA graphic representation components having the one or more of the part numbers of the selection.

In a further aspect, a smart questionnaire tool of the computer system for loading into the database receives temperature and time limits for respective electronic component part numbers. The smart questionnaire tool compares the received temperature and time limits to predetermined temperature and time limit requirements already in the database and generates an error message when a time and temperature limit requirement is not met.

In another aspect, the method includes loading temperature and time limits for respective electronic component part numbers into the database from computer readable forms by a smart questionnaire tool of the computer system.

In another aspect, a module of the scrub tool extracts reference designators of components for the PCBA from computer readable data for a bill of materials for the PCBA. The module of the scrub tool merges the reference designators into a report of the temperature and time limits for the one or more part numbers found in the database.

In another aspect, an analysis module of the computer system, receives reference designators of highlighted components selected by the user as mounting components, wherein each respective mounting component is for mounting a respective temperature sensor and wherein the analysis module associates each respective mounting component to a respective temperature sensor responsive to the received reference designators.

In a further aspect, the analysis module received, for each respective temperature sensor, a selection of one or more additional ones of the highlighted components for association with the respective temperature sensor. The selection of the one or more additional ones of the highlighted components is responsive to where the one or more additional ones of the highlighted components are located on the PCBA relative to the respective temperature sensor. The analysis module associates the one or more additional ones of the highlighted components with the respective temperature sensor responsive to the received user selection of the one or more additional ones of the highlighted components.

In another aspect, the analysis module receives data from a monitoring module for respective signals generated by the respective temperature sensors, the signals being generated when the PCBA is heated in a manufacturing process, wherein the data for the respective signals indicate temperatures encountered by the respective temperature sensors. The analysis module compares the temperature encountered by each respective temperature sensor to the time and temperature limits of the one or more electronic components associated with the respective temperature sensor, wherein responsive to the comparing the analysis module sends a thermal indication for showing whether any of the time and temperature limits were exceeded during the manufacturing process.

Other embodiments of the invention are disclosed and claimed, including a computer system implementation and a computer program product.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Herein below, information is described, including a BOM, a component database, component manufacturing standards and physical design data, which are for use by software tools, including a smart questionnaire, a BOM scrub tool, a mapping tool and a monitoring/analysis tool. According to embodiments of the present invention, the information may be provided in digital form and stored on computer readable storage media either locally or remotely from the software tools, so that the tools may access, read from and write to the information either locally or via a network.

Figure 4:
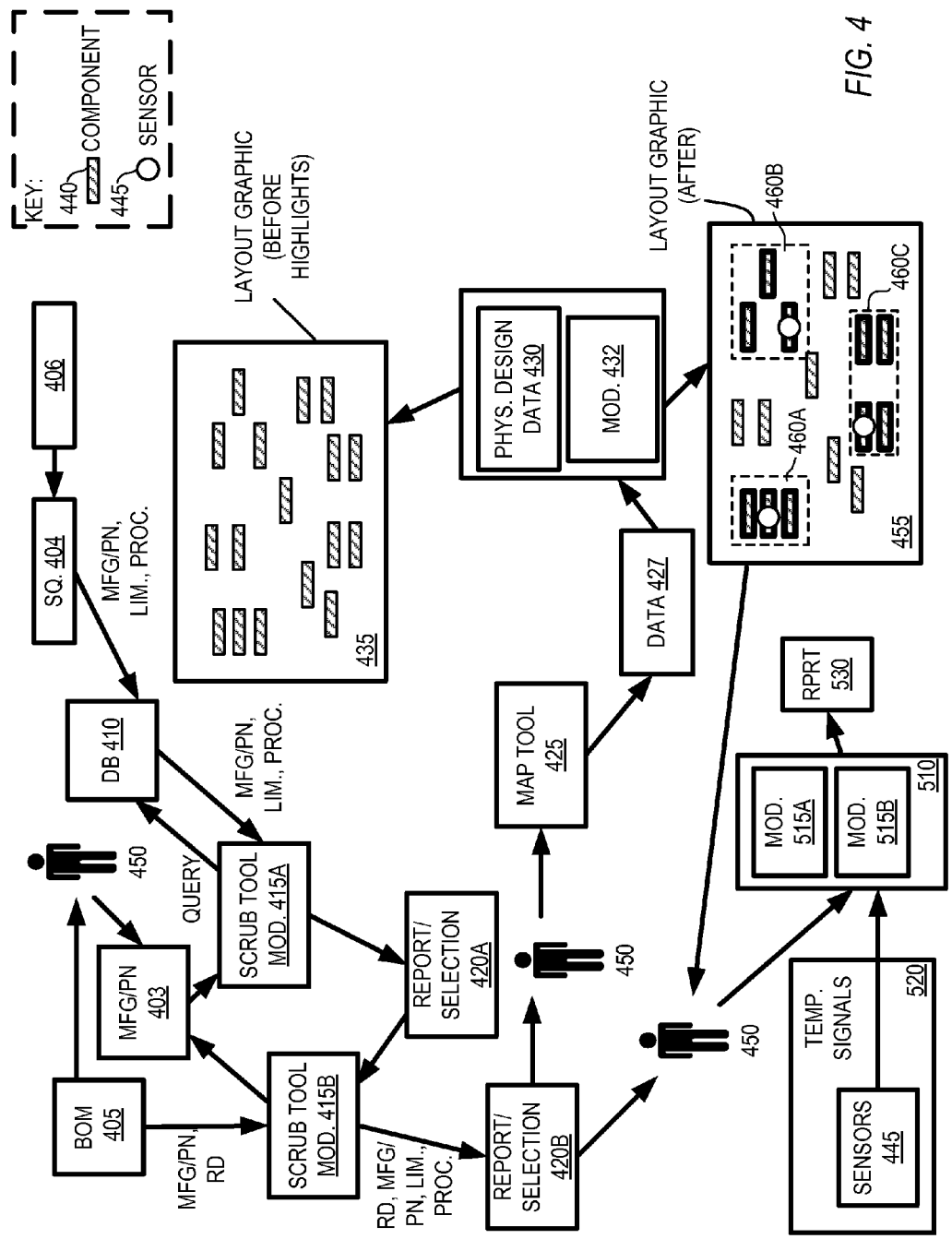
FIG. 4 illustrates structure of data and instructions for temperature sensitive component mapping, according to embodiments of the present invention.

Referring now to FIG. 4, for embodiments of the present invention, a BOM 405, a smart questionnaire 404, and a BOM scrub tool 415 are provided. For a typical component 440, BOM 405 may include information indicating a manufacturer of a particular component 440 along with the manufacturer's part number for the component 440. BOM 405 may also include a reference designator ("RD") for each component 440, which corresponds to a reference designator included in physical design data 430 provided for the PCBA, which may include an assembly drawing. Thus, the reference designator indicates a location where component 440 resides on the PCBA according to physical design data 430. One way the location of a component 440 may be indicated is for its reference designator to be shown graphically on a layout 435 depicted in the assembly drawing.

The following illustrates a portion of data structure in BOM 405, according to embodiments of the present invention:

| Part Number | Manufacturer | Reference Designator(s).. |
|---|---|---|
| 112234 | Alfa | C101, C102, C103 |
| 7589461 | Bravo | R001, R002 |
| 3850188 | Charlie | U1201. |
| ... | ... | ... |

Besides identifiers for components 440 on a PCBA 520, each PCBA 520 may itself have an identifier, such as a part number, to distinguish it from other types of PCBA's. A BOM 405 for a particular type of PCBA may also include that PCBA's identifier.

Physical design data 430 may include, for example, a .brd file formatted according to an Allegro design environment. ("Allegro" is a trademark of Cadence Design Systems, Inc.) Other formats may also be supported. Physical design data 430 provides a physical design environment that includes a physical design software program for creating layouts of PCBA's. That is, as the term "physical design data" is used here, it may include the physical design software program.

The following illustrates structure of a portion of data in physical design data 430, which indicates locations of components by their respective reference designators and coordinates, for example, according to embodiments of the present invention:

| Reference Designator | x-y Location | Part number |
|---|---|---|
| C101 | 2945.000 935.000 | 112234 |
| R001 | 4955.000 1475.000 | 7589461 |
| U1201 | 882.500 3997.500 | 850188 |
| ... | ... | ... |

Also according to embodiments of the present invention, a component 440 database 410 is compiled and provided from information published by component 440 manufacturers on industry standard or manufacturer specific forms 406 or from information obtained by communication with component 440 manufacturers. According to one method, this includes executing a smart questionnaire 404, which includes a user interface configured to prompt a user 450 to enter the information about components 440 that may be used for PCBA's into a data structure, which database 410 receives, including part number, manufacturer and temperature specifications, for example, which may include limits regarding the maximum amount of time each component can withstand a given temperature. User 450 who enters component data via smart questionnaire 404 may be a component engineer, for example.

Further, smart questionnaire 404 is configured to perform an auto load function, by which smart questionnaire 404 accesses computer readable data forms 406 provided by component manufacturers. Smart questionnaire 404 is also configured to evaluate the data entered against values specified in industry standards or by user 450 to ensure that the provided values are appropriate or within an expected range.

In another aspect, according to embodiments of the present invention, the information gathered in a data structure of the smart questionnaire 404 from component 440 supplier is transferred manually or via an automated software process into database 410, such as by a command already supported by database 410 or else written for the data structure of smart questionnaire 404. The information received, such as via smart questionnaire 404, and transferred to database 410 categorizes component 440 environmental limits, such that the categories indicate particular processes to which the temperature, time at temperature, ramp rate, and reflow limits are applicable, such as i) initial component 440 solder attach, for example, which may be further categorized according to type of soldering, such as soldering for surface mount technology ("SMT") or wave soldering, which is for plated through hole ("PTH") technology, and ii) so-called "post-attach" processes, including, but not limited to, moisture bake of assembled printed circuit board, preheat of assembled printed circuit board prior to SMT or PTH rework, and adhesive or epoxy cure of assembled printed circuit board. Processes may include surface mount reflow, vapor phase reflow, wave solder, hot gas rework, local vapor phase rework, solder fountain rework, and manual hand iron methods.

As a result of user 450 entering information, and as a result of database 410 receiving and storing the information, as described above, database 410 contains information that indicates for each component 440, according to its part number, the capability of that part number to withstand specified processing conditions for attaching that component 440 to a printed circuit board assembly, such as PCBA 520 in FIG. 4, and to withstand processes performed on PCBA 520 assembly after component 440 has been attached per conditions specified i) in an industry standard and/or ii) documented by user 450. The resulting component 440 capability information stored in database 410 states temperature and duration limits along with other processing limitations. Examples include time at temperature, ramp rate, and reflow limits that a component 440 can withstand.

Once this information has been included in database 410, then database 410 has part numbers, manufacturer and temperature specifications for components 440 that may be used for a PCBA, such as PCBA 520, and may be a source for looking up temperature-related limit information responsive to a component 440 part number.

Temperature sensitive component report generation software application module 415A of scrub tool 415 is configured to receive a set of part numbers, such as by importing the set of part numbers as a file 403, which may be generated via user 450 manually entry, where user 450 reads the part numbers from a BOM 405 for a particular PCBA 520. Scrub tool module 415A is configured, according to embodiments of the present invention, to alternatively import the set of part numbers from BOM 405 by including a software application module 415B that reads a BOM 405 data structure, e.g., file, extracts the set of part numbers and presents them as a part number list, such as in the form of a text file 403, for example.

Temperature sensitive component report generation software application module 415A of scrub tool 415 also provides a database 410 query and report generation capability, by which a user 450 may request from database 410 temperature sensitive data for each part number in a particular PCBA responsive to the part number list 403 manually input or imported from a file by user 450. Responsive to such a request, module 415A generates a temperature sensitive component report 420A providing temperature specification data for each requested part number on list 403. (Typically user 450 who queries database 410 for such temperature specifications is a user concerned with controlling a PCBA manufacturing process, rather than a component engineer.)

Software application module 415B provides a temperature sensitive component optimization tool that imports temperature sensitive component report data 420A generated by module 415A. Module 415B also accesses BOM 405 file to extract reference designators for the part numbers listed therein, which module 415B merges with report 420A to generate report 420B that includes a reference designator along with part number for each component 440 of list 403. Module 415B is configured to also sort and filter the components 440 in list 403 of temperature sensitive component report 420A responsive to a user 450 query, wherein the sorted and filtered query result from module 415B is presented as a report 420B, as further described herein below.

It should be appreciated from the foregoing that for each component 440 listed in BOM 405, scrub tool module 415A looks up in database 410 the relevant temperature, time at temperature, ramp rate, reflow limits and other requirements and then provides this information in report 420A for all parts listed in BOM 405. Scrub tool module 415B is configured to generate reports 420B listing components 440 that are sensitive to particular processes, for example, where the generating may be responsive to a request received by module 415B from a user 450 whose request specifies the process of interest.

Generating a report 420B listing components 440 sensitive to a particular process may include module 415B sorting the list of components 440, such that components 440 having part numbers sensitive to a specified process are grouped together and presented at the top of a list of components 440, and may include sorting within manufacturing process categories such that components 440 whose part numbers have lowest temperature-withstand capability are listed first within each type of process category. For example, the table below illustrates a portion of data from report 420B sorted for SMT process sensitive components. Part numbers for user 450 selected types of components 440 in report 420B are input to map tool 425 by user 450, according to embodiments of the present invention. For example, user 450 may select components 440 whose part numbers are most sensitive to a specified process, which are presented together at the top of a list in report 420B generated responsive to a query via module 415B by user 450 for the specified process.

| Part Number | Reference Designator | Manufacturer | SMT Process Sensitive? | Process Limit |
|---|---|---|---|---|
| 566254 | C608 | Bravo | YES | Peak Temp = 245 C. max |
| 758594 | R102 | Bravo | YES | Time above 217 C. = 30 sec max |
| 112234 | C101 | Alfa | YES | Number of reflow cycles = 2 |

Herein, reference is made to component 440 "types." An example of a component 440 functional type includes a discrete component, such as a resistor, capacitor, transistor, diode, etc. and an integrated circuit or assembly component, such as a processor, ASIC, crystal, filter, DRAM, SRAM, display, power regulator, buffer, etc. A PCBA may have components 440 of different part numbers that are the same functional type of component 440. Generally, however, according to embodiments of the present invention, reference herein to a component "type" concerns components 440 having a particular part number.

Scrub tool 415 module 415B is further configured to generate reports 420B that present components 440 sorted by component 440 reference designators, part numbers or component 440 types, which may include generating a report 420B showing components 440 that are missing part numbers, according to embodiments of the present invention. (A missing part number may mean that some data for that part number is missing in database 410, e.g., data from a component manufacturer, and prompts user 450 to contact a component engineer responsible for that part number to obtain temperature sensitive component information from the component manufacturer and to then enter the information into database 410.)

In another aspect, according to embodiments of the present invention, a mapping tool 425 is provided, which is configured to generate a data structure 427, such as a file, for a physical design software tool 432 to read, such as by user 450 initiated importing to tool 432 or otherwise. A software module added to the program of physical design data 430 provides tool 432. Data structure 427 identifies components 440 that user 450 selected via report 420B for temperature monitoring due to temperature sensitivity of the selected components 440. Data structure 427 indicates component 440 type by part number and how that part number will be highlighted (color, fill pattern, etc.), as selected by user 450 when user 450 inputs selected component 440 part numbers to map tool 425.

Physical design data program 430 generates and presents a graphic depiction 435 of the PCBA layout, e.g., assembly drawing, where locations of respective components 440 are indicated at least by outlines or icons, and may also be shown by respective reference designators on graphic layout 435 of PCBA 520. Responsive to data 427 generated by mapping tool 425, physical design software tool 432 communicates to program 430, indicating a user selected type of highlighting for each user selected part number indicated in file 427, so that program 430 responsively presents a modified layout depiction 455 that highlights physical locations of the one or more of component 440 part numbers selected by user 450 due to their temperature sensitivity. (The example of FIG. 4 shows only ten components 440 highlighted in PCBA 520 layout 455 and shows only 17 components in total. It should be appreciated however that this illustration is simplified in order to particularly point out certain issues and structures. PCBA 520 may have many more than 17 components 440 overall and many more than ten selected components 440.)

Highlighting physical locations of the one or more of components 440 selected by user 450 may include hiding depiction of components 440 not selected by user 450. However, according an embodiment of the present invention shown in FIG. 4, the highlighting includes presenting the selected components 440 in bold fashion. Alternatively, highlighting may include presenting the selected components 440 in a different color and/or fill pattern than non-selected components.

In another aspect, user 450 attaches temperature sensing devices 445, such as thermocouples or resistance temperature devices, to components 440 selected by user 450. That is, by causing physical design software tool 432 to highlight all the instances of components 440 of a particular one or more part numbers (in different colors and/or shades), this allows a user to see where those particular part numbers are located, so the user can make decisions regarding where to best put temperature sensors 445 to optimize coverage for them. Accordingly, in embodiments of the present invention, user 450 selects components for attaching sensors 445 (i.e., "mounting components," to which respective sensors 445 shall be attached) based on information presented to user 450 in layout graphic 455, where the information presented includes highlighted locations of components 440 on PCBA 520 whose part numbers are most temperature sensitive relative to a particular manufacturing process. In a particular instance, the manufacturing process may be SMT soldering, for example. It should be understood that a for a specific temperature sensitive component 440, printed circuit board assembly 520 may have 100 or more components 440 of this part number, so that it is typically not physically possible and/or cost prohibitive to provide a temperature sensing device 445 for each individual component 440.

As previously stated, mapping tool 425 generates data 427 needed for tool 432 to cause the program of physical design data 430 to graphically identify, at their locations on the PCBA 520, those components 440 whose part numbers are the most temperature sensitive, e.g., most sensitive relative to a particular manufacturing process. Graphically identifying the most temperature sensitive components 440 enables user 450 to select locations on PCBA 520 for placement of temperature sensors 445 such that there are temperature sensors 445 located proximate to a representative sample of the most temperature sensitive components 440. In the example, ten components 440 are shown, each being the same part number, although in other instances the components 440 selected for monitoring by temperature sensors 445 may be disparate part numbers. Even components 440 selected for association with a single sensor 445 may have disparate part numbers.

Due to graphic depiction 455, user 450 may observe that the highlighted components 440 happen to be grouped in three regions on printed circuit board assembly 520 in the illustrated instance of FIG. 4, as shown by the dashed lines shown on layout 455, i.e., a group 460A of three components 440 in the upper left corner, a group 460B of three components 440 in the upper right corner and a group 460C of four components 440 in the lower right corner. Consequently, user 450 chooses in the illustrated instance to locate a sensor 445 on one of the components 440 in each of these areas as shown. For example, user 450 selects three components 440 as a set 460A (shown by dashed lines) and associates all three of them with a single sensor 445, which is attached to one of these three components. Likewise, three other components 440 are selected as a set 460B (again shown by dashed lines) and associated with another sensor 445 located on one of the components in the group 460B of three. Finally, four other components 440 are selected as a set 460C (once again shown by dashed lines) and associated with another sensor 445 located on one of the components in the group 460C of four. According to embodiments of the present invention, user 450 may choose these three groups 460A, B and C because component 440 group 460A has one type of component 440 or temperature limitation or both, group 460B has another type, and group 460C has another, as indicated in report 420B due to a query via tool 415B performed by user 450.

Variations may exist regarding how close a temperature sensor must be in order to be considered in "close proximity" in this context. However, in certain embodiments of the present invention a temperature sensor is considered sufficiently close proximity to a component 440 to provide a reliable indication of temperature effects on the component 440 if the temperature sensor is located within an area of two square inches surrounding the component 440.

Also provided is a computerized monitoring/analysis device 510 running monitoring software module 515A and temperature sensitive component analysis software module 515B, which may be a plug in added to module 515A according to embodiments of the present invention. Recall that herein above it is disclosed that user 450 may select temperature sensitive components 440 via query or sorting by scrub tool 415A and via corresponding report 420B generated by scrub tool module 415B, which adds reference designators for the respective components 440, according to embodiments of the present invention. Accordingly, for these user 450 selected temperature sensitive components 440, module 515B receives reference designators and temperature/time limits, such as by manual user 450 input from report 420B.

From the foregoing it should be understood that part numbers and reference designators each serve different purposes, in at least some respects, and may be used as described herein to cooperatively enable different aspects of embodiments of the present invention. If a particular part number is temperature sensitive, all component 440 instances of that part number are temperature sensitive, regardless of the locations of those components 440 on PCBA 520. Thus, if file 427 identifies part numbers that are deemed temperature sensitive for a particular situation and identifies type of highlighting for each part number, this is sufficient information (without reference designators) for software tool 432 to communicate to enable program 430 to responsively highlight all components 440 that are deemed temperature sensitive for that situation, given that physical design data 430 includes part numbers and the component 440 location of each part number. As previously explained, by causing physical design software tool 432 to highlight all the instances of components 440 of a particular one or more part numbers on PCBA graphic representation 455, this allows a user to see where those particular part numbers are located, so the user can make decisions regarding where to best put temperature sensors 445.

Reference designators, on the other hand, identify where individual component 440 instances of a part number are located on a PCBA 520. Graphic representation 455 of PCBA 520 shows reference designators for components 440. Also, scrub tool 415B adds reference designators to report 420A, creating report 420B. Thus, graphic representation 455 both report 420B both provide reference designators for use in identifying a selected instance of a component 440 where a temperature sensor 445 is to be mounted, so that module 515B maps the sensed temperature to that particular one of the components 440. Likewise, reference designators are used herein to identify instances of other components 440 that are close enough to the sensor 445 to be deemed a member of the same group of components 440. A user 450 may refer to either graphic representation 455 or report 420B or both to see reference designators. In many situations user 450 will refer to reference designators on graphic representation 455 to decide where to mount temperature sensors 445 and which components 440 to associate with respective sensors 445. However, report 420B further shows user 450 part numbers associated with the reference designators, which is uniquely useful in some circumstances. Report 420B may be used for screening prior to generating modified graphic representation 455 showing highlighted temperature sensitive components 440. For example, if only one component 440 is temperature sensitive on a PCBA 520, then user 450 does not need to refer to graphic 455 in order to select the component 440 on which to mount a sensor 445, so that user 450 does not need to use mapping tool 425 aspects that generate a highlighted graphic 455. Also, by reference to report 420B, user 450 may see that one or more components 440 cannot possibly withstand the manufacturing process, in which case user 450 may immediately initiate action to choose one or more different part numbers by notification and communication of the part number(s) and reference designator(s).

Device 510 is electrically connected to temperature sensors 445, which provide temperature measurement signals that are input to device 510. Device 510 is wired and located proximate to printed circuit board assembly 520 while PCBA 520 undergoes the particular manufacturing process, such as SMT reflow in the exemplary instance. This may include PCBA 520 and device 510 riding into an oven or at least past a heat source, such as on a conveyor, for example, according to the particular manufacturing process. In an embodiment, device 510 may be tethered to PCBA 520, by the wiring or otherwise, such that device 510 is local to PCBA 520, such as within two meters, for example. It should be understood that although device 510 is not shown as a wirelessly-connected, remote device in FIG. 4, in alternative embodiments monitoring/analysis device 510 may be located remotely from PCBA 520 as the PCBA 520 undergoes the manufacturing process, wherein transmitters (not shown) electrically coupled to temperature sensors 445 are included on PCBA 520 for transmitting the temperature signals from sensors 445 on PCBA 520 to remote device 510.

So that temperatures measured by respective sensors 445 are associated with respective corresponding components 440, module 515A is also configured to receive user 450 input indicating which temperature sensor 445 input signal user 450 wants to correspond to which components 440. In certain embodiments of the present invention, components 440 to which user 450 associates temperature sensors 445 may be the most temperature sensitive ones of components 440 for a particular manufacturing process. As previously described, these associations established by user 450 may be based on physical positions of highlighted components 440 on PCBA 520 as shown in depiction 455. Modules 515A and 515B are configured to sample the temperature signals from sensors 445 via hardware of tool 510, which is done repeatedly throughout the manufacturing process, and are configured to record the measured temperatures and times. Module 515B automatically determines respective results indicating for each of the most temperature sensitive components 440 whether the component 440 was subjected in the manufacturing process to a temperature or times at temperature in excess of its specified permissible for that process. This may be done in real time, i.e., while PCBA 520 is subjected to the manufacturing process. For a given component 440 on a given PCBA 520 that is being monitored for a particular manufacturing process, tool 515B automatically makes the determination based on the measured temperature and time record for the temperature sensor 445 associated with the component 440 and based on module 515B comparing temperature/time limit information for the component 440.

For example, the following illustrates a portion of a report generated by analysis tool 515B showing i) input that analysis tool 515B obtains as described herein above and ii) output that analysis tool 515B generates by comparison of received temperature sensor 445 measurements to associated component 440 temperature limit data, according to embodiments of the present invention:

| Input Sensor | Input RD | Input Measured Parameter | Input Limit | Input Actual | Output Okay? |
|---|---|---|---|---|---|
| 1 | C101 | Peak Temp | 260 C. | 265 C. | No |
| 1 | C101 | Time >217 C. | 150 s | 186 s | No |
| 2 | C120 | Peak Temp | 260 C. | 245 C. | Yes |
| 2 | C120 | Time >217 C. | 150 s | 118 s | Yes |
| 3 | U100 | Time within 5 C. of Peak | 30 s | 42 s | No |

Figure 5A:
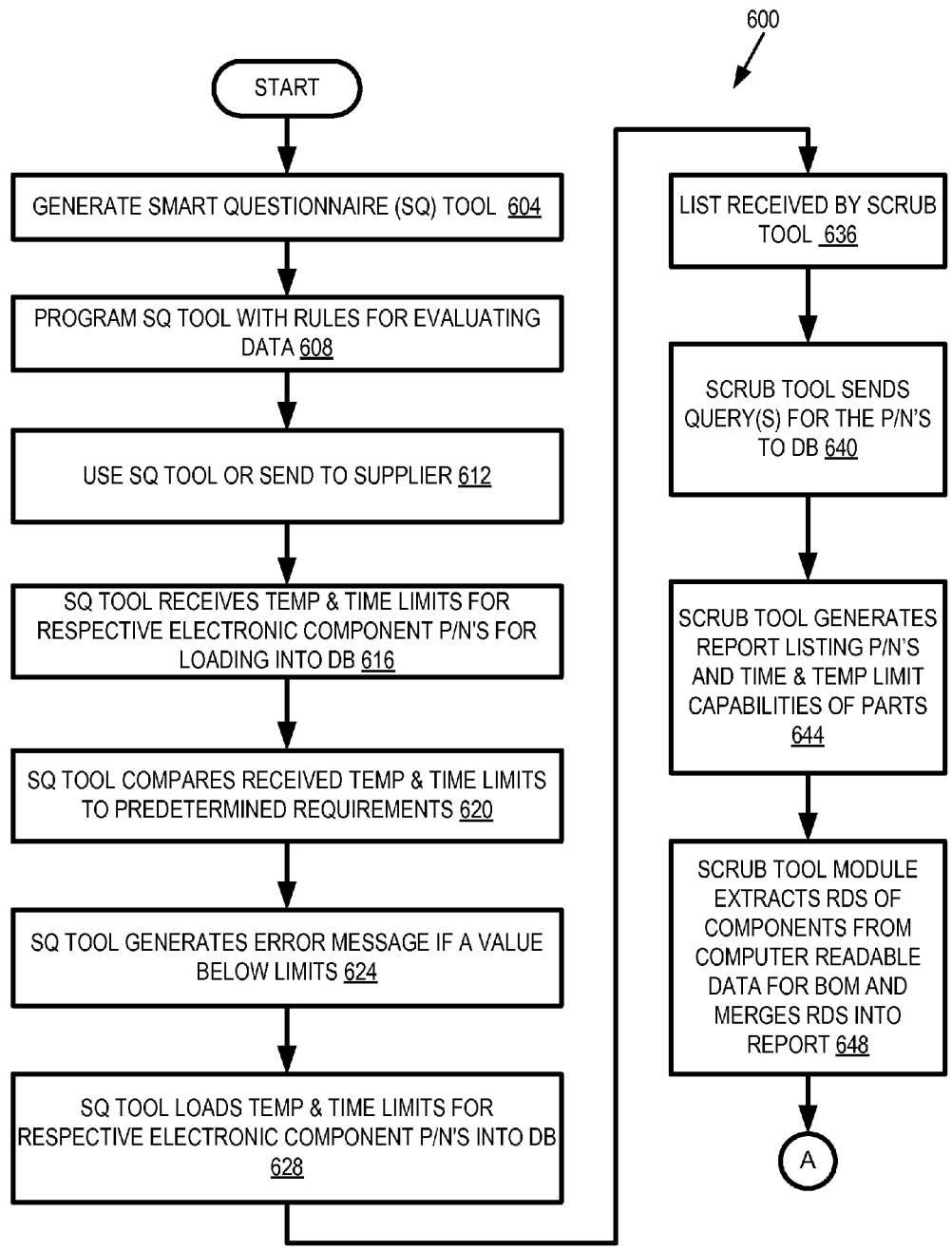
FIGS. 5A and 5B illustrate a method for temperature sensitive component mapping, according to embodiments of the present invention.
Figure 5B:
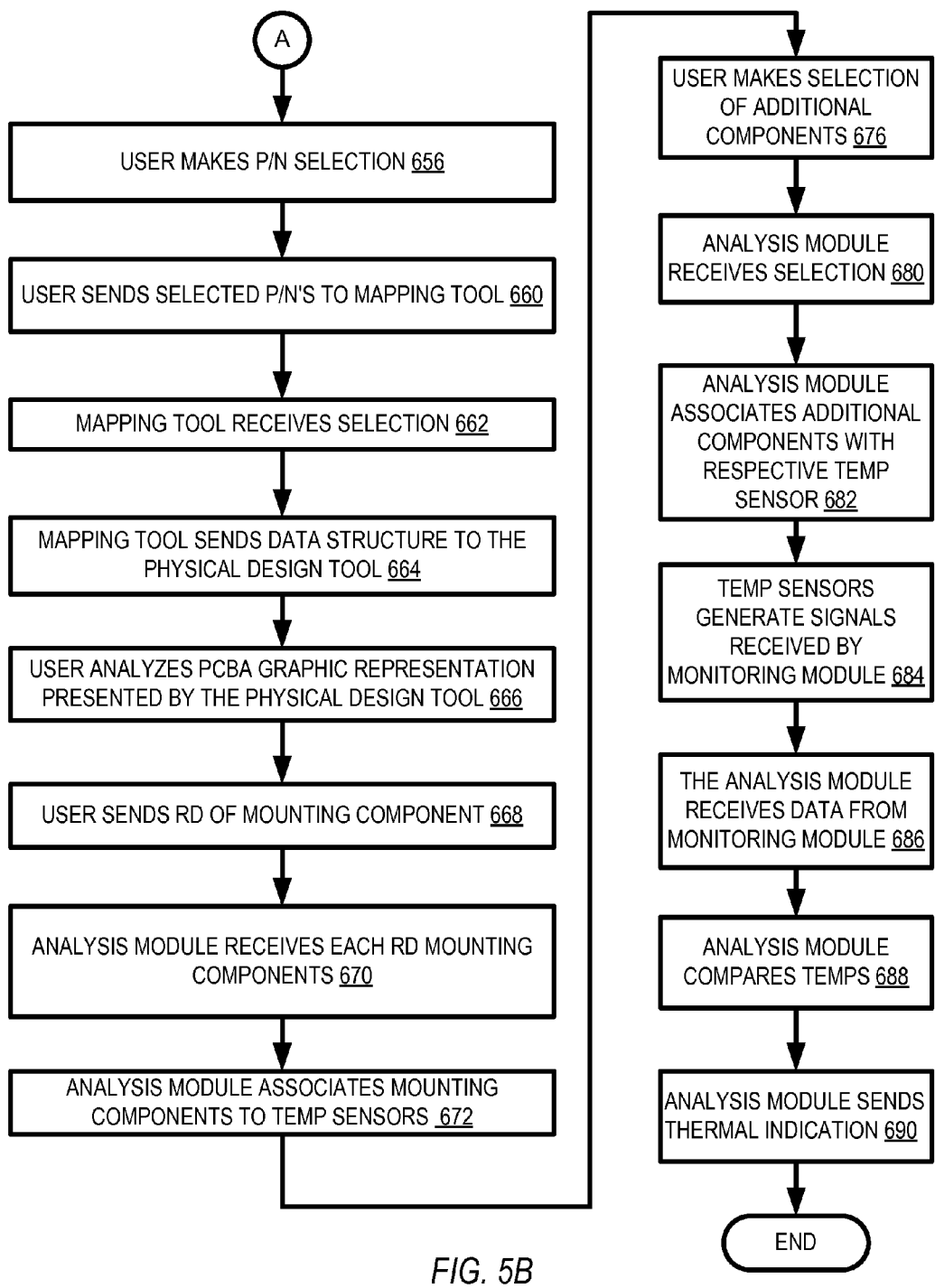

Referring now to FIG. 5 in connection with FIG. 4, actions are illustrated in flowchart 600 that are performed, such as by the above described software or apparatus or both, according to embodiments of the present invention. A component engineer or similar technical person, e.g., a technical person engaged in manufacturing PCBA's, for example, generates 604 a smart questionnaire tool for receiving time and temperature limit capability data for electronic components that will populate a PCBA, this includes programming 608 the tool with rules for evaluating the data, as will be explained further herein below. Then the engineer sends 612 the tool to a supplier or otherwise makes it available to the supplier, according to embodiments of the present invention. (Alternatively, the component engineer may use the tool instead of sending it to a supplier.) The tool may include an online form that the supplier interacts with to enter data, where the tool evaluates the data entered by the supplier via an evaluation component running on a computer that is remote from the supplier. Alternatively, the evaluation component runs on the supplier's computer. The form and the evaluation component may be included in a stand-alone spreadsheet that the supplier runs on the supplier's computer, for example.

The smart questionnaire tool receives 616 temperature and time limits for respective electronic component part numbers for loading into a database, such as a database maintained by the component engineer for the PCBA manufacturer. For example, the smart questionnaire tool may receive the temperature and time limits from the supplier or the component engineer may use the tool to enter the limits.

The smart questionnaire tool compares 620 the received temperature and time limits to predetermined temperature and time limit requirements pre-programmed in the tool. That is, SQ evaluates whether time and temperature limits entered by a user for a particular part number are within acceptable ranges, which it may do by comparing the entered time and temperature limit values, which indicate capability of the component to withstand heat up to those limits, to requirements for one or more manufacturing processes.

The SQ also compares the entered values to one or more industry standard classifications the user enters for the component. The industry standard may apply to most electronic components, although it may provide a classification for peak temperature based on component volume and area, since smaller devices tend to heat up more than those with larger thermal mass when subjected to same hot air convection during reflow operation, for example. Generally, however, all other industry standard classifications, other than peak reflow temperature, may apply to all electronic devices.

As an example, the manufacturer may require a component to be capable of withstanding temperature above the melting point of (Pb-free solder), which is 217 C, for at least 150 seconds. This is a time and temperature limit capability for the component. So SQ compares a value entered to SQ to this predetermined limit.

The smart questionnaire tool generates 624 an error message for the user if a value they entered for this capability is below 150 seconds. SQ also checks to see that one or more industry standard classification rating that the user entered is correct for the time and temperature limit value they entered. For example, the J-STD-075 standard requires the supplier to classify their product stating how sensitive it is to assembly processes, including temperature, time, chemicals, etc. The classification is a 3 character code referred to as a PSL code. The first is either a W or R, where W is for wave solder attach and R is for reflow solder attach. The second character is a number that corresponds to the peak temperature the device can withstand, where 1 is 275, 2 is 270, 3 is 265, 4 is 260c, and so on, and 0 is used if the device is not sensitive to its required peak temperature for its process and package size. The third character is a letter that is defined by what other parameter(s) the device cannot meet. Some of the letters are tied to a single process parameter, others are common combinations of parameters that a package style cannot meet. Specifically, the following are third characters of a PSL code, according to the J-STD-075 standard:

A—Component has a Thermal Spike limitation.
C—Component has a Preheat limitation.
E—Component has a Time in Wave limitation.
F—Component has a Time (tL) Above 217° C. liquidous temperature (TL) limitation.
N—Component has limitations: C; F; G and J.
P—Component has limitations: C; F; G and H.
Y—Component has additional limitations but the combination has not been assigned a code. Details of these unique limitations will need to be obtained from the Supplier. The letter Y is a sort of catch-all for any combination that is not covered with its own letter.

When receiving data by SQ for a device, after receiving some basic information about the device (like solder wave or convection reflow attach), SQ prompts the user to enter the PSL code and then the specific information about each of the requirements, if the device cannot meet one or more of the requirements specified in the SQ by the manufacturer. As a specific example, consider a situation in which a manufacturer requirement preprogrammed in SQ (i.e., prior to receiving data entry for components) was 150 seconds time above liquidous ("TAL") temperature of solder (217 C), and the user enters data for the device indicating it can only withstand 70 seconds. The user should also enter a character F for the industry classification PSL third character, to indicate the device has this TAL limitation. If the user enters a different character, other than F for this third character, SQ informs the user entering data that there is an error. For example, for an SQ embodiment, the user enters data into a spreadsheet preprogrammed with the rules for checking data entry as described herein above and if the user enters data in a line of the spreadsheet that violates a rule, the spreadsheet generates red text next to that line in the spreadsheet and on a check page.

In another example of how SQ may be used, a manufacturing requirement may specify that the TAL capability of a device may be below a certain time limit if certain steps are taken regarding a different manufacturing process requirement. For example, if the TAL capability of a device is below a certain manufacturing limit, the TAL duration may be increased if manufacturing lowers the peak temperature below some temperature limit.

For example, if the TAL capability of a device is below a certain manufacturing limit, the supplier may enter a new TAL duration capability for the device based on a lower peak temperature during manufacturing. If the device has a peak temperature withstand capability that is already above the manufacturer's required minimum, for example, the supplier may determine a new, lower peak temperature to specify in SQ for the part that is still above the manufacturer's minimum required peak temperature limit, where the lower specified peak temperature raises the TAL capability of the device to above the manufacturer's minimum TAL limit. Or the manufacturer may specify a peak temperature capability for the part that is below the manufacturer's required minimum, in order to raise the supplier's specified TAL capability, and let the manufacturer decide if the manufacturer can reasonably lower the peak temperature in manufacturing.

In addition to SQ being programmed with requirements for industry standard J-STD-075, which covers when components are originally soldered to a PCBA, SQ is also programmed with additional, post-attach requirements, which are requirements for after components are soldered to the PCBA, including rework, bake the card for other operations, etc.

The smart questionnaire tool loads 628 temperature and time limits for respective electronic component part numbers into the database. This may be by loading a computer readable file generated by the tool when the supplier entered data, such as, for example, a spreadsheet file.

In order for a scrub tool to receive a list of part numbers for electronic components of a PCBA, a module of the scrub tool extracts part numbers of components for the PCBA from BOM computer readable data for the PCBA and communicates them to another component of the scrub tool. Alternatively, a user may manually extract the part number list from the BOM and generate a file for the list. Either way, the list is received 636 by the scrub tool. The scrub tool sends 640 at least one query for the part numbers to the database. The one or more queries are configured for finding, in the database, temperature and time limits of the electronic components having the part numbers of the list.

For the query result, the scrub tool generates 644 a report that lists the part numbers of the list and the time and temperature limit capabilities of the parts.

A module of the scrub tool extracts 648 reference designators of components for the PCBA from computer readable data for a BOM for the PCBA and merges the reference designators into the report generated at 644.

A user makes a selection 656 of one or more part numbers found by the one or more queries in the database, where the selection is responsive to the temperature and time limits shown in either or both of the reports and sends 660 the selected part numbers to a mapping tool, which receives the selection at 662. The mapping tool generates a data structure from the received list of one or more selected part numbers that is a compatible structure the user analyzes 666 communicating with a physical design tool of the computer system, wherein the physical design tool is configured with physical design data for generating a graphic representation of the PCBA, including representation of components on the PCBA. The mapping tool sends 664 the data structure to the physical design tool. Thus, the data structure from the mapping tool provides the received selection of one or more part numbers and configures the physical design tool to responsively highlight on the PCBA graphic representation components having the one or more of the part numbers of the selection.

The user analyzes 666 the PCBA graphic representation presented by the physical design tool, which shows the locations of components identified by their reference designators. In performing this analysis, the user also refers to the modified report generated at 648, which shows the reference designators and time and temperature limitations for components on the PCBA. Based on the analysis, the user sends 668 a reference designator of a component that the user selects for mounting a temperature sensor, referred further to herein as a "mounting" component. An analysis module of the computer system receives 670 each reference designator of highlighted components selected by the user as mounting components. Each respective mounting component is for mounting a respective temperature sensor. The analysis module associates 672 each respective mounting component to a respective temperature sensor responsive to the received reference designators.

For each mounting component, the user also makes a selection 676 of one or more additional ones of the highlighted components and sends this to the analysis module. The selection 676 is responsive to where the one or more additional ones of the highlighted components are located on the PCBA relative to the respective mounting component with its temperature sensor mounted thereon. Thus, for each respective temperature sensor, the analysis module receives 680 a selection of one or more additional ones of the highlighted components for association with the respective temperature sensor and associates 682 the one or more additional ones of the highlighted components with the respective temperature sensor responsive to the received user selection of the one or more additional ones of the highlighted components.

The temperature sensors generate 684 signals received by a monitoring module when the PCBA is heated in a manufacturing process, and the monitoring module sends the data for the respective signals to the analysis module, thereby indicating temperatures encountered by the respective temperature sensors. The analysis module receives 686 the data from the monitoring module for respective signals generated by the respective temperature sensors and compares 688 the temperature encountered by each respective temperature sensor to the time and temperature limits of the one or more electronic components associated with the respective temperature sensor. Responsive to the comparing, the analysis module sends 690 a thermal indication for showing whether any of the time and temperature limits were exceeded during the manufacturing process.

Figure 1:
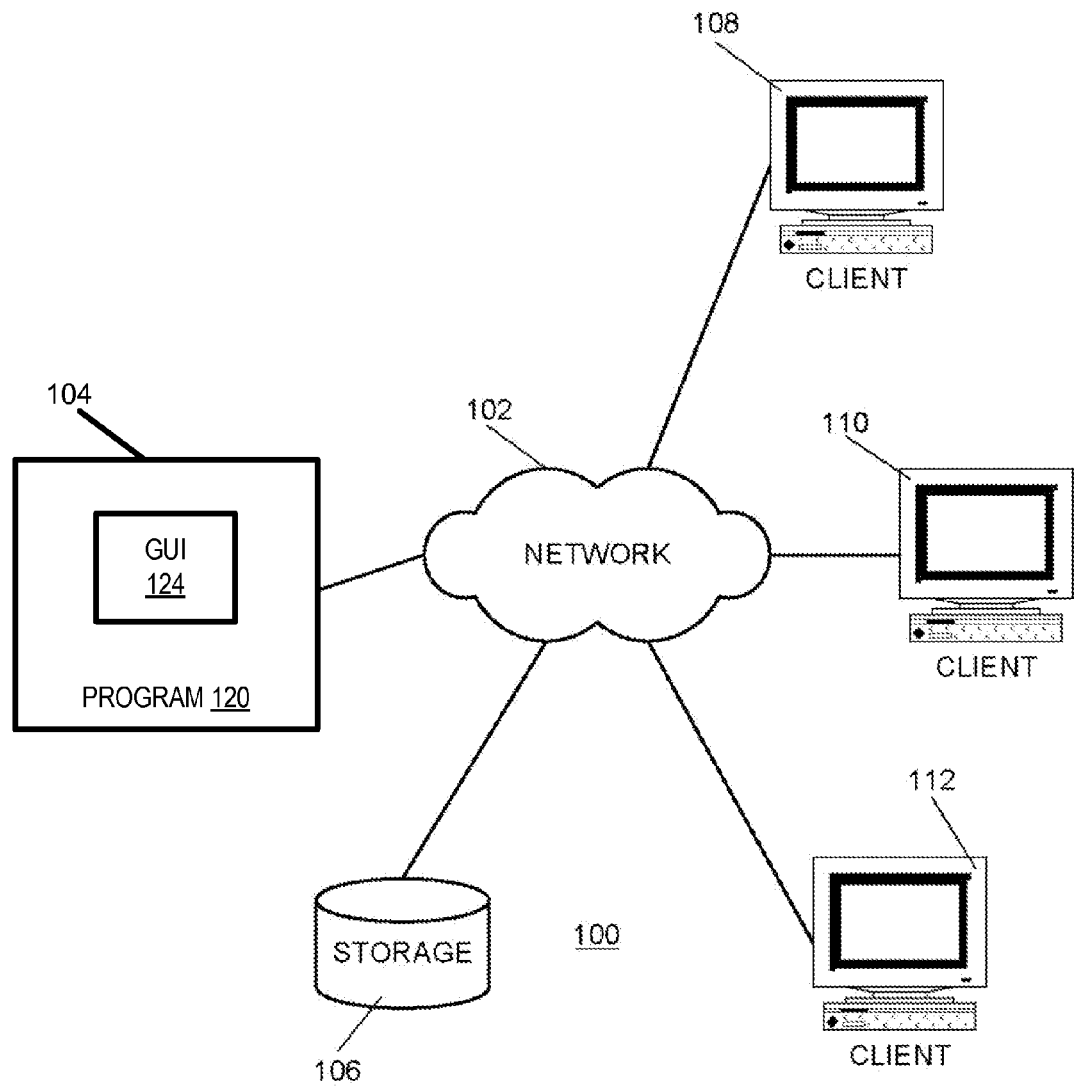
FIG. 1 is an exemplary block diagram illustrating a distributed data processing system according to embodiments of the invention.

Regarding FIG. 1, a pictorial representation of a network data processing system 100 is shown in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
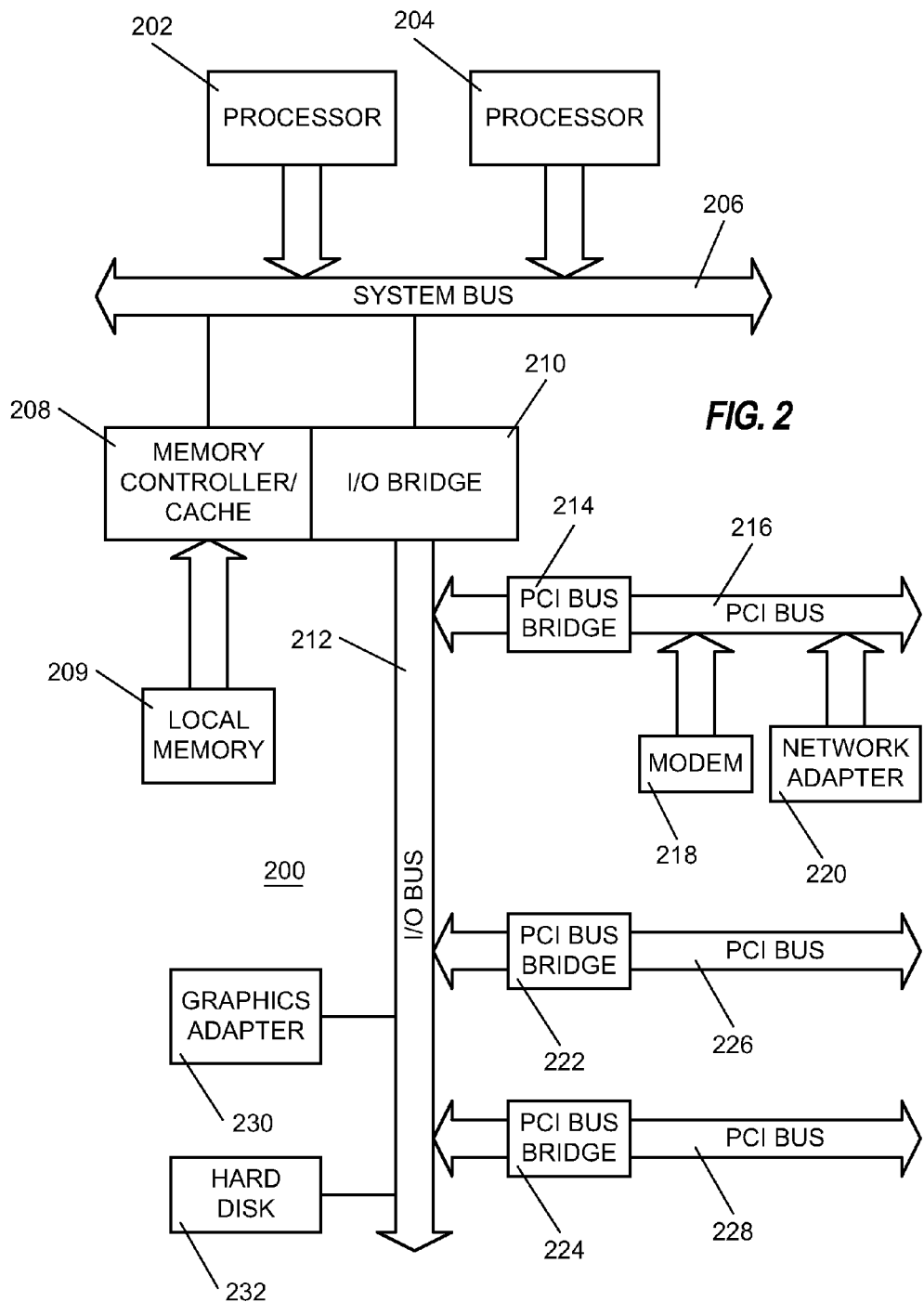
FIG. 2 is an exemplary block diagram of a server apparatus according to embodiments of the invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support one or more PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ series system, running the IBM® AIX® operating system or LINUX® operating system. (IBM, eServer and AIXZ are trademarks of International Business Machines Corporation, registered in many jurisdictions worldwide. Linux is a registered trademark of Linus Torvalds in the United States, other countries, or both.)

Figure 3:
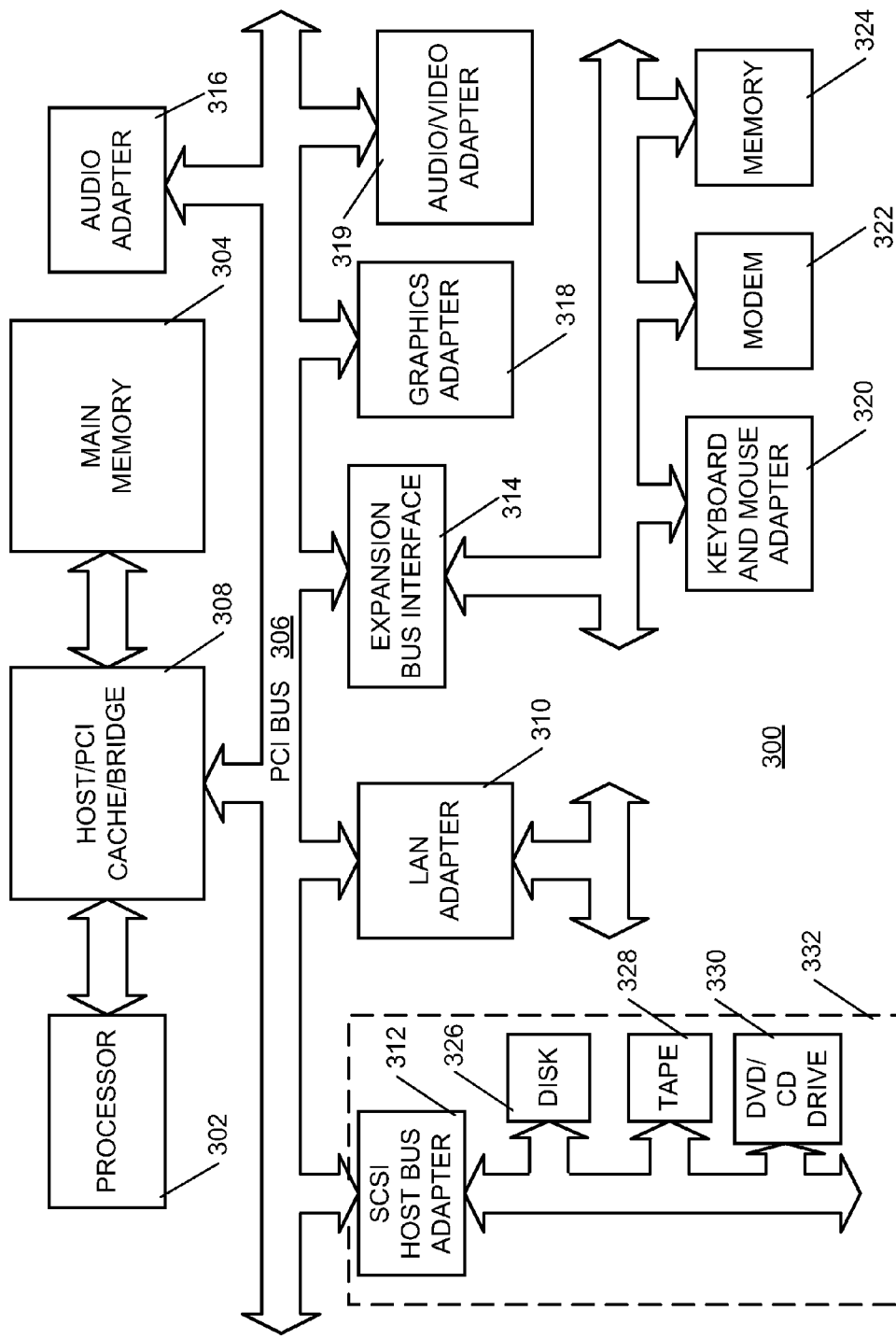
FIG. 3 is an exemplary block diagram of a client apparatus according to embodiments of the invention.

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support a plurality of PCI expansion slots or add-in connectors.

An operating system runs on processor 302 and is used to coordinate and provide control of various components within data processing system 300 in FIG. 3. The operating system may be any available operating system (commercial or open source). An object oriented programming system may run in conjunction with the operating system and provide calls to the operating system from programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, applets, scripts, extensible markup language (XML), dynamic HTML, cascading style sheets (CSS), helper applications, plug-ins, and the like.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Those skilled in the art having read this disclosure will recognize that changes and modifications may be made to the embodiments without departing from the scope of the present invention.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments.

However, the benefits, advantages, solutions to problems, and any element(s) that may cause any benefit, advantage, or solution to occur or become more pronounced are not to be construed as critical, required, or essential features or elements of any or all the claims.

What is claimed is:

1. A computer system implemented method comprising:
receiving, by a scrub tool of a computer system, a list of part numbers for electronic components of a printed circuit board assembly ("PCBA");
sending one or more queries to a database by the scrub tool, wherein the one or more queries are configured for finding temperature and time limits of the electronic components having the part numbers of the list;
receiving, by a mapping tool of the computer system, a selection of one or more part numbers found in the database responsive to the one or more queries, wherein the selection is responsive to the temperature and time limits;
sending a data structure from the mapping tool to a physical design tool of the computer system, wherein the physical design tool is configured with physical design data for generating a graphic representation of the PCBA, including representation of components on the PCBA, and wherein the data structure from the mapping tool provides the received selection of one or more part numbers and configures the physical design tool to responsively highlight on the PCBA graphic representation components having the one or more of the part numbers of the selection;
receiving, by an analysis module of the computer system, reference designators of highlighted components selected by the user as mounting components, wherein each respective mounting component is for mounting a respective temperature sensor and wherein the analysis module associates each respective mounting component to a respective temperature sensor responsive to the received reference designators;
receiving for each respective temperature sensor, by the analysis module, a selection of one or more additional ones of the highlighted components for association with the respective temperature sensor, wherein the selection of the one or more additional ones of the highlighted components is responsive to where the one or more additional ones of the highlighted components are located on the PCBA relative to the respective temperature sensor, and wherein the analysis module associates the one or more additional ones of the highlighted components with the respective temperature sensor responsive to the received user selection of the one or more additional ones of the highlighted components;
receiving, by the analysis module, data from a monitoring module for respective signals generated by the respective temperature sensors, the signals being generated when the PCBA is heated in a manufacturing process, wherein the data for the respective signals indicate temperatures encountered by the respective temperature sensors; and
comparing, by the analysis module, the temperature encountered by each respective temperature sensor to the time and temperature limits of the one or more electronic components associated with the respective temperature sensor, wherein responsive to the comparing the analysis module sends a thermal indication for showing whether any of the time and temperature limits were exceeded during the manufacturing process.

2. The method of claim 1, comprising:
receiving, by a smart questionnaire tool of the computer system for loading into the database, temperature and time limits for respective electronic component part numbers; and
comparing, by the smart questionnaire tool, the received temperature and time limits to predetermined temperature and time limit requirements already in the database; and
generating an error message by the smart questionnaire tool when a time and temperature limit requirement is not met.

3. The method of claim 2, comprising:
loading temperature and time limits for respective electronic component part numbers into the database from computer readable forms by a smart questionnaire tool of the computer system.

4. The method of claim 1, comprising:
extracting, by a module of the scrub tool, reference designators of components for the PCBA from computer readable data for a bill of materials for the PCBA; and
merging, by the module of the scrub tool, the reference designators into a report of the temperature and time limits for the one or more part numbers found in the database.

5. A system comprising:
a processor; and
computer readable storage media having instructions stored thereon for execution by the processor, wherein the instructions executed by the processor cause the processor to perform operations comprising:
receiving, by a scrub tool of a computer system, a list of part numbers for electronic components of a printed circuit board assembly ("PCBA");
sending one or more queries to a database by the scrub tool, wherein the one or more queries are configured for finding temperature and time limits of the electronic components having the part numbers of the list;
receiving, by a mapping tool of the computer system, a selection of one or more part numbers found in the database responsive to the one or more queries, wherein the selection is responsive to the temperature and time limits;
sending a data structure from the mapping tool to a physical design tool of the computer system, wherein the physical design tool is configured with physical design data for generating a graphic representation of the PCBA, including representation of components on the PCBA, and wherein the data structure from the mapping tool provides the received selection of one or more part numbers and configures the physical design tool to responsively highlight on the PCBA graphic representation components having the one or more of the part numbers of the selection;
receiving, by an analysis module of the computer system, reference designators of highlighted components selected by the user as mounting components, wherein each respective mounting component is for mounting a respective temperature sensor and wherein the analysis module associates each respective mounting component to a respective temperature sensor responsive to the received reference designators;
receiving for each respective temperature sensor, by the analysis module, a selection of one or more additional ones of the highlighted components for association with the respective temperature sensor, wherein the selection of the one or more additional ones of the highlighted components is responsive to where the one or more additional ones of the highlighted components are located on the PCBA relative to the respective temperature sensor, and wherein the analysis module associates the one or more additional ones of the highlighted components with the respective temperature sensor responsive to the received user selection of the one or more additional ones of the highlighted components;

receiving, by the analysis module, data from a monitoring module for respective signals generated by the respective temperature sensors, the signals being generated when the PCBA is heated in a manufacturing process, wherein the data for the respective signals indicate temperatures encountered by the respective temperature sensors; and comparing, by the analysis module, the temperature encountered by each respective temperature sensor to the time and temperature limits of the one or more electronic components associated with the respective temperature sensor, wherein responsive to the comparing the analysis module sends a thermal indication for showing whether any of the time and temperature limits were exceeded during the manufacturing process.

6. The system of claim 5, wherein the processor performs further operations controlled by the instructions comprising:

receiving, by a smart questionnaire tool of the computer system for loading into the database, temperature and time limits for respective electronic component part numbers; and comparing, by the smart questionnaire tool, the received temperature and time limits to predetermined temperature and time limit requirements already in the database; and generating an error message by the smart questionnaire tool when a time and temperature limit requirement is not met.

7. The system of claim 6, wherein the processor performs further operations controlled by the instructions comprising:

loading temperature and time limits for respective electronic component part numbers into the database from computer readable forms by a smart questionnaire tool of the computer system.

8. The system of claim 5, wherein the processor performs further operations controlled by the instructions comprising:

extracting, by a module of the scrub tool, reference designators of components for the PCBA from computer readable data for a bill of materials for the PCBA; and merging, by the module of the scrub tool, the reference designators into a report of the temperature and time limits for the one or more part numbers found in the database.

9. A computer program product including a computer readable storage medium having instructions stored thereon for execution by a computer, wherein the instructions, when executed by the computer, cause the computer to perform operations comprising:

receiving, by a scrub tool of a computer system, a list of part numbers for electronic components of a printed circuit board assembly ("PCBA");

sending one or more queries to a database by the scrub tool, wherein the one or more queries are configured for finding temperature and time limits of the electronic components having the part numbers of the list;

receiving, by a mapping tool of the computer system, a selection of one or more part numbers found in the database responsive to the one or more queries, wherein the selection is responsive to the temperature and time limits;

sending a data structure from the mapping tool to a physical design tool of the computer system, wherein the physical design tool is configured with physical design data for generating a graphic representation of the PCBA, including representation of components on the PCBA, and wherein the data structure from the mapping tool provides the received selection of one or more part numbers and configures the physical design tool to responsively highlight on the PCBA graphic representation components having the one or more of the part numbers of the selection;

receiving, by an analysis module of the computer system, reference designators of highlighted components selected by the user as mounting components, wherein each respective mounting component is for mounting a respective temperature sensor and wherein the analysis module associates each respective mounting component to a respective temperature sensor responsive to the received reference designators;

receiving for each respective temperature sensor, by the analysis module, a selection of one or more additional ones of the highlighted components for association with the respective temperature sensor, wherein the selection of the one or more additional ones of the highlighted components is responsive to where the one or more additional ones of the highlighted components are located on the PCBA relative to the respective temperature sensor, and wherein the analysis module associates the one or more additional ones of the highlighted components with the respective temperature sensor responsive to the received user selection of the one or more additional ones of the highlighted components;

receiving, by the analysis module, data from a monitoring module for respective signals generated by the respective temperature sensors, the signals being generated when the PCBA is heated in a manufacturing process, wherein the data for the respective signals indicate temperatures encountered by the respective temperature sensors; and comparing, by the analysis module, the temperature encountered by each respective temperature sensor to the time and temperature limits of the one or more electronic components associated with the respective temperature sensor, wherein responsive to the comparing the analysis module sends a thermal indication for showing whether any of the time and temperature limits were exceeded during the manufacturing process.

10. The computer program product of claim 9, wherein the instructions, when executed by the computer, cause the computer to perform operations comprising:

receiving, by a smart questionnaire tool of the computer system for loading into the database, temperature and time limits for respective electronic component part numbers; and comparing, by the smart questionnaire tool, the received temperature and time limits to predetermined temperature and time limit requirements already in the database; and generating an error message by the smart questionnaire tool when a time and temperature limit requirement is not met.

11. The computer program product of claim 10, wherein the instructions, when executed by the computer, cause the computer to perform operations comprising:

loading temperature and time limits for respective electronic component part numbers into the database from computer readable forms by a smart questionnaire tool of the computer system.

12. The computer program product of claim 9, wherein the instructions, when executed by the computer, cause the computer to perform operations comprising:

extracting, by a module of the scrub tool, reference designators of components for the PCBA from computer readable data for a bill of materials for the PCBA; and merging, by the module of the scrub tool, the reference designators into a report of the temperature and time limits for the one or more part numbers found in the database.

\* \* \* \* \*